Patented Apr. 20, 1926.

1,581,621

UNITED STATES PATENT OFFICE.

RALF B. TRUSLER, OF PITTSBURGH, PENNSYLVANIA, ASSIGNOR TO THE ROESSLER & HASSLACHER CHEMICAL COMPANY, OF NEW YORK, N. Y., A CORPORATION OF NEW YORK.

PRODUCTION OF AMIDE ACID SULPHATES FROM NITRILES.

No Drawing.    Application filed July 22, 1925. Serial No. 45,384.

*To all whom it may concern:*

Be it known that I, RALF B. TRUSLER, a citizen of the United States, and resident of 1321 Tennessee Ave., Dormont, Pittsburgh, in the county of Allegheny and State of Pennsylvania, have invented certain new and useful Improvements in the Production of Amide Acid Sulphates from Nitriles, of which the following is a specification.

It has long been known that nitriles can be hydrolyzed by alkalis or acids, producing more or less quantitatively (1) in the first case, an alkali salt of an acid corresponding to the nitrile with the liberation of ammonia, and (2) in the second case, an acid corresponding to the nitrile, together with an ammonium salt.

I have made a departure from these methods of hydrolysis of nitriles and have discovered a means for partially hydrolyzing nitriles by sulphuric acid monohydrate whereby the nitrile is converted into an amide acid sulphate.

I have found that there are several classes of nitriles of the formula R—CN some members of which decompose when treated with sulphuric acid monohydrate, or partially decompose before hydrolysis is complete. Some of these nitriles are well known compounds, such as the sugar cyanohydrins, while others are little known, such as the nitriles formed by condensing ethylidene aniline with HCN. The individual nitriles which cannot be treated by this method are so varied that they cannot be placed under any one heading.

A straight chain aliphatic nitrile of the formula

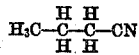

is easily and nearly quantitatively converted into the amide acid sulphate by sulphuric acid mono-hydrate. If, however, one hydroxy group is substituted in this to give a hydroxy nitrile as

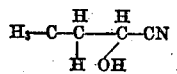

the compound still can be hydrolyzed in the same manner with but little decomposition, to give a hydroxy amide acid sulphate. However, if two or more adjacent hydroxyls occur as,

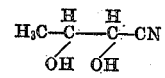

decomposition becomes serious and large amounts of the material decompose and char.

Further some classes of compounds have members which split off HCN on treatment with sulphuric acid monohydrate. For example,

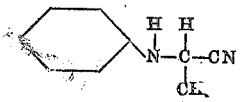

I have therefore chosen to designate R in my general formula R—CN as standing for hydrogen or for any monovalent aliphatic, cyclic or aromatic group or derivative thereof indifferent to the action of sulphuric acid monohydrate. In this way I limit the application to those nitriles wherein the group R is so little attacked by sulphuric acid monohydrate as not to seriously interfere with the yields of the amide acid sulphates and I designate this limitation in the claims by the phrase "indifferent to the action of sulphuric acid monohydrate".

By reacting a nitrile limited as above and represented by the formula R—CN with sulphuric acid monohydrate, a reaction product comprising an amide acid sulphate is obtained to which the formula

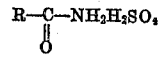

may be assigned. Sulphuric acid monohydrate is defined here as the acid whose composition is represented by the formula $H_2SO_4.H_2O$.

I have discovered also, that a considerable saving in the time required for the conversion of a nitrile into an amide acid sulphate is effected by the addition of a small amount of a halide of the type AX, where A stands for hydrogen, an organic radical, or an inorganic radical, and where X stands for a halogen radical of one or more of the following: fluorine, chlorine, bromine, and iodine. Furthermore, I have found that an inert liquid may be added to and mixed with reactants which consist of a nitrile and sulphuric acid monohydrate, with or without a halide of the type AX just defined, for the purpose of obtaining the amide and sulphate in a divided state.

For the purpose of illustrating my discoveries I give the following examples:—

*Example I.*—One mol of hydrogen cyanide, weighing 27 grams and 1 mol of sulphuric acid monohydrate weighing approximately 116.1 grams to which the formula $H_2SO_4.H_2O$ has been assigned, are both cooled to prevent loss of the hydrogen cyanide by volatilization and too rapid reaction when the two components are mixed. The two reactants are then mixed by adding one to the other with stirring and preferably with cooling. The mixture which is liquid and completely miscible and homogeneous is allowed to react while it is kept cool. The temperature may vary through a wide range, but temperatures from 0° C. to 10° C. are suitable. After an indefinite time, sometimes extending to 7 days, crystals begin to form in the liquid which has in the meantime become more viscous, and finally the entire mixture becomes a solid, white, crystalline mass.

The conversion of hydrogen cyanide to formamide acid sulphate may be illustrated by the equation:

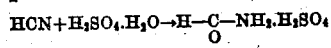

Analysis of the crystalline compound has shown it to be composed of the following elements in the percentages given, subject of course to the usual limitations of experimental error:

|  | Per cent. |
|---|---|
| Hydrogen | 3.52 |
| Carbon | 8.38 |
| Nitrogen | 9.79 |
| Sulphur | 22.39 |
| Oxygen by difference | 55.92 |

Furthermore, it has been found that both formamide and sulphuric acid may be separated from the compound by known chemical means.

*Example II.*—One mol of hydrogen cyanide weighing 27 grams and 1 mol of sulphuric acid monohydrate weighing 116.1 grams are cooled and mixed and to the mixture is added one-tenth to two-tenths of a gram of ammonium chloride. The reaction mixture is permitted to react in the cold. After an indefinite period of standing varying from a few hours, to approximately 24 hours, the liquid reactants are converted into crystalline formamide acid sulphate. I do not wish to limit myself to the weights of catalyst here given, nor to the period of time allotted for the reaction, for it is understood that the period for reaction is shorter when more of the catalyst is used, and in comparison, is longer if the reaction is conducted at lower temperatures.

*Example III.*—One mol of hydrogen cyanide weighing 27 grams and 1 mol of sulphuric acid monohydrate weighing 116.1 grams are cooled and mixed and to this mixture are added two-tenths of a gram of sodium chloride and an arbitrary amount of carbon tetrachloride, in this case 200 cc. The mixture is stirred during the period of reaction. The crystals of formamide acid sulphate resulting from the partial hydrolysis of hydrogen cyanide by sulphuric acid monohydrate are to a great extent kept from coalescing and are thus obtained in a more convenient physical form.

*Example IV.*—One mol of acetaldehyde cyanohydrin (lactonitrile or alpha-hydroxy propionic nitrile) weighing 71.06 grams and 1 mol of sulphuric acid monohydrate weighing about 116.1 grams are cooled and mixed. A homogeneous solution results. To this a catalyst consisting of 0.2 gram of sodium fluoride may be added. The liquid is then gradually warmed so that in the course of about 8 hours a temperature of 70° C. has been reached.

By this time the liquid has become more viscous and of syrupy consistency, and no longer is composed essentially of acetaldehyde cyanohydrin (lactonitrile or alpha-hydroxy propionic nitrile) and sulphuric acid monohydrate, but is mainly composed of lactamide acid sulphate.

The nature of the reaction which takes place between acetaldehyde cyanohydrin and sulphuric acid monohydrate may be represented by the equation:

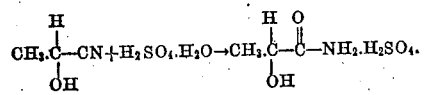

If the product obtained by the method just described is allowed to stand for a long period of time, crystallization will occur, whereby there will be obtained a white, crystalline compound having the composition shown by the formula,

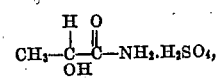

which is here defined as lactamide acid sulphate.

The reaction product consisting of lactamide acid sulphate may be separated by known chemical means into a sulphate and lactamide.

I do not wish to restrict the use of my process to the limits of temperature and time here given, for I have found that the conversion of the nitrile takes place at temperatures below 0° C. and above 70° C. and that the time required for the reaction varies with changes of both temperature and catalyst.

*Example V.*—One mol of benzo nitrile weighing about 103.08 grams and one mol of sulphuric acid monohydrate are preferably first cooled, and then mixed until a homogeneous solution results. Two-tenths of a gram of aniline hydrochloride are then stirred in as a catalyst. The reaction mixture is then gradually heated to about 60° C. during about two hours, and thence to about 70 or 75° C. during about another hour. By this treatment, the liquid benzonitrile is converted into a solid compound which has been found to consist essentially of benzamide acid sulphate, which is here represented by the formula

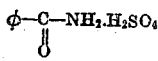

where $\phi$ represents the phenyl group, as defined by standard chemical texts.

The course of the reaction is illustrated by the equation,

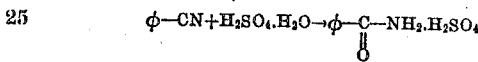

From the benzamide acid sulphate, benzamide may be obtained. For example:—

Pulverized benzamide acid sulphate is stirred into ammoniacal alcohol. The sulphuric acid constituent of benzamide acid sulphate is neutralized by the ammonia and remains as an insoluble precipitate while benzamide is taken into solution in the alcohol. By evaporating the alcohol, benzamide is recovered.

Claims:

1. The addition product of a nitrile and sulphuric acid monohydrate.

2. A stable compound comprising an amide acid sulphate of the general formula

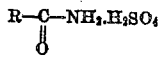

in which R represents an organic radical indifferent to the action of sulphuric acid monohydrate.

3. Formamide acid sulphate represented by the formula

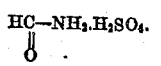

4. The process of partially hydrolyzing a nitrile of the general formula R—CN, wherein R represents an organic radical indifferent to the action of sulphuric acid monohydrate, by treatment with sulphuric acid monohydrate.

5. A process consisting in partially hydrolyzing a nitrile of the general formula R—CN, wherein R represents an organic radical indifferent to the action of sulphuric acid monohydrate, by sulphuric acid monohydrate in the presence of a salt of a halogen acid.

6. A process consisting in partially hydrolyzing a nitrile of the general formula R—CN wherein R represents an organic radical indifferent to sulphuric acid monohydrate by sulphuric acid monohydrate in the presence of a salt of a halogen acid.

7. A process consisting in partially hydrolyzing a nitrile of the general formula R—CN, wherein R represents an organic radical indifferent to the action of sulphuric acid monohydrate, by sulphuric acid monohydrate in the presence of a salt of a halogen acid and while suspended in an inert liquid.

8. A process consisting in partially hydrolyzing a nitrile of the general formula R—CN, wherein R represents an organic radical indifferent to the action of sulphuric acid monohydrate, by sulphuric acid monohydrate in the presence of a salt of a halogen acid and while suspended in carbon tetrachloride.

9. A process consisting in partially hydrolyzing a nitrile of the general formula R—CN, wherein R represents an organic radical indifferent to the action of sulphuric acid monohydrate, by sulphuric acid monohydrate in the presence of sodium chloride.

10. A process consisting in partially hydrolyzing a nitrile of the general formula R—CN wherein R represents an organic radical indifferent to the action of sulphuric acid monohydrate by sulphuric acid monohydrate in the presence of sodium chloride and while suspended in carbon tetrachloride.

11. A process consisting in partially hydrolyzing HCN by sulphuric acid monohydrate.

12. A process consisting in partially hydrolyzing a nitrile of the general formula R—CN, wherein R represents an organic radical indifferent to the action of sulphuric acid monohydrate, by sulphuric acid monohydrate in the presence of a catalyst containing a halide radical.

13. A process consisting in partially hydrolyzing a nitrile of the general formula R—CN wherein R represents an organic radical, indifferent to the action of sulphuric acid monohydrate, by sulphuric acid monohydrate in the presence of a catalyst containing a halide radical and while suspended in carbon tetrachloride.

Signed at Pittsburgh, in the county of Allegheny and State of Pennsylvania, this 14th day of July, A. D. 1925.

RALF B. TRUSLER.